Dec. 29, 1931.  J. FERNANDEZ  1,838,989

GEAR SHIFT CAGE

Filed May 28, 1931

INVENTOR
*J. Fernandez*

BY HIS ATTORNEY

Patented Dec. 29, 1931

1,838,989

UNITED STATES PATENT OFFICE

JESUS FERNANDEZ, OF BROOKLYN, NEW YORK

GEAR SHIFT CAGE

Application filed May 28, 1931. Serial No. 540,519.

The main object of this invention is to provide a guide cage for a gear shift lever for automobiles for the purpose of limiting the movement of the gear shift lever in various positions when shifting to any of the various speeds.

The above and other objects will become apparent in the description below in which characters of reference refer to like-named parts in the drawings.

Figure 1:
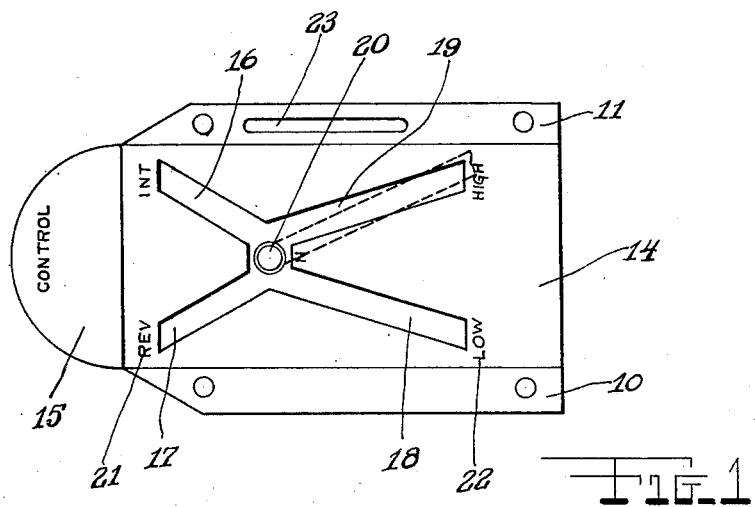
Figure 1 is a top plan view of the cage showing the gear shift lever in neutral position.
Figure 2:
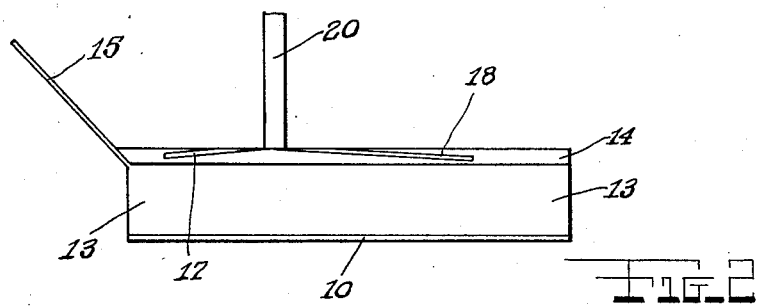
Figure 2 is a side elevational view of Figure 1.
Figure 3:
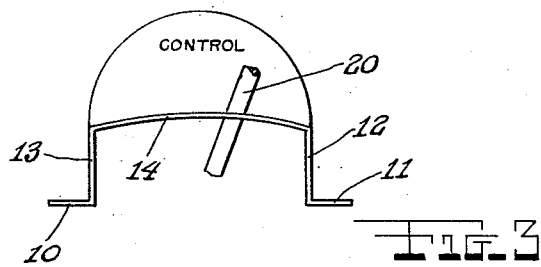
Figure 3 is an end elevational view of Figure 1.

Referring in detail to the drawings, the numerals 10 and 11 indicate the tongues that extend from a pair of parallel walls 12 and 13. These parallel walls are joined by a convexly curved apron 14 at one end of which an inclined panel 15 is located. The panel lies flush upon the inclined foot-board of the automotive vehicle in which the cage is mounted and serves as an element upon which an instruction code is inscribed. The apron 14 is provided with a guide runway comprising two converging channels 16 and 17. Where these two channels meet a second pair of forwardly converging extending channels 18 and 19 are provided. All of these channels meet at a common point in which the gear shift lever 20 is located when the transmission mechanism is in neutral position. The channel 17 serves as a guideway for the gear shift lever when the transmission mechanism is shifted to reverse position. This channel is so indicated by the characters 21 inscribed on the apron at the extremity of the channel. The adjacently disposed channel 16 on the apron serves as a guide member for leading the gear shift lever 20 to low gear position. This channel is indicated by character 22 at the extremity thereof. The remaining merging channels 16 and 19 which together with the channel 17 and 18 form a runway similar to an X serving as lead ways for the gear shift lever to the intermediate or high position and are so indicated by characters inscribed on the apron at the extremities of the channels 16 and 19.

The cage is adapted to serve as a means for guiding the gear shift lever 20 into low, intermediate, or high speed positions, or into the reverse position. One of the tongues 11 has a slot 23 from which the emergency brake lever protrudes. This cage is adapted to be mounted upon the floor of an automotive vehicle above the gear shift mechanism and is positive in its function. When the gear shift lever is projected into the channel 18 and urged rearwardly therein, suitable gears in the transmission system mesh and form a low speed ratio. As a slight momentum of the vehicle is obtained the gear shift lever 20 is shifted from low past the neutral position into the intermediate channel 16 still further increasing the momentum. When this is accomplished and high speed is to be obtained, the gear shift lever is shifted from the channel 16 into the channel 19. The panel 15 serves as a constantly visual memorandum of the code of instructions used in the operation of the gear shift lever.

It is to be noted that certain changes in form and construction may be made without departing from the spirit and scope of the invention.

I claim:

A device of the class described comprising parallel walls adapted to be mounted on the floor of a vehicle on opposite sides of the gear shift, a convex hood joining said walls, said hood having a V-shaped cut-out portion on one side providing two converging channels merging at the base of the V, a second oppositely-disposed V-shaped cut-out in said hood providing two additional converging channels merging at the base of the V, both of said cut-out portions merging at a common point with each other, the shifting lever of said gear shift passing through said common point when in neutral positions, said channels providing paths along which said lever is moved in shifting to the various gear-shift positions.

In testimony whereof I affix my signature.

JESUS FERNANDEZ.